United States Patent [19]

Suzuki et al.

[11] Patent Number: 4,546,998

[45] Date of Patent: Oct. 15, 1985

[54] GUIDING DEVICE FOR FRONT SEAT BELTS

[75] Inventors: Ichiro Suzuki; Masanao Motonami; Makoto Yamada; Noritada Yoshitsugu, all of Toyota, Japan

[73] Assignee: Toyota Jidosha Kabushiki Kaisha, Aichi, Japan

[21] Appl. No.: 580,244

[22] Filed: Feb. 15, 1984

[30] Foreign Application Priority Data

Feb. 22, 1983 [JP] Japan .............................. 58-24602[U]

[51] Int. Cl.⁴ ............................................. B60R 21/10
[52] U.S. Cl. ..................................... 280/807; 297/482
[58] Field of Search ....................... 280/801, 808, 807; 297/482

[56] References Cited

U.S. PATENT DOCUMENTS

| | | | |
|---|---|---|---|
| 3,291,526 | 12/1966 | Nicholas | 297/482 |
| 3,572,832 | 3/1971 | Graham et al. | 297/482 |
| 4,213,651 | 7/1980 | Yoshitsugu et al. | 280/807 |
| 4,457,538 | 7/1984 | Watanabe et al. | 280/807 |

FOREIGN PATENT DOCUMENTS 1024116 1/1978 Canada ............................... 280/801

191145 11/1982 Japan ................................... 280/801
WO81/01661 6/1981 PCT Int'l Appl. ................ 280/807

*Primary Examiner*—Joseph F. Peters, Jr.
*Assistant Examiner*—Ross Weaver
*Attorney, Agent, or Firm*—Parkhurst & Oliff

[57] ABSTRACT

A guiding device for a front seat belt for a vehicle having a cross member formed at a rear seat side on an automotive floor and a floor tunnel, which has a retractor for the front seat belt, fixedly secured into an opening formed at the cross member, a boot fixedly secured to the side of the floor tunnel between the front side of the rear seat and the rear side of the front seat for guiding the floor seat belt drawn from the retractor, and a floor carpet arranged to cover the boot and formed with a belt passage hole, from which the seat belt is drawn to the front seat side through a belt outlet formed at the boot. Thus, the front seat belt is not exposed in an occupant's leg preserving portion of a rear seat to prevent the front seat belt from disturbing the occupant's legs at the rear seat and to simultaneously prevent the front seat belt from being contaminated with preferable external appearance and smooth extension and retraction of the front seat belt.

9 Claims, 4 Drawing Figures

4,546,998

GUIDING DEVICE FOR FRONT SEAT BELTS

BACKGROUND OF THE INVENTION

The present invention relates to improvements in a front seat belt system for a vehicle in which a retractor is fixed into a cross member which is attached to the automotive floor panel.

An automatic seat belt system for a front seat has been proposed, as shown in FIG. 3. A retractor D of a front seat belt C is, in order to provide sufficient space for the rear seat A occupant's legs in area B and to increase the comfort of the occupant sitting on the rear seat A, fixed into an opening G located in the cross member F attached to the automotive floor E. The seat belt C drawn out of the retractor D is guided through a guide I fixed to the side of the front seat H. Since the seat belt C drawn out of the retractor D is guided along the floor tunnel J through the outside of the floor carpet to a guide I in this system, the portion K of the seat belt C disadvantageously makes contact with the legs of the occupant sitting on the rear seat A to disturb the seat belt C and to contaminate the belt C. Further, the portion K of the belt C crosses over a long area in the automotive compartment of the vehicle which lessens its external appearance.

SUMMARY OF THE INVENTION

Accordingly, an object of the present invention is to provide a guiding device for a front seat belt in which the front seat belt is not exposed to the rear seat occupant's legs. Another object of the present invention is to simultaneously prevent the front seat belt from being contaminated and improving the external appearance and operation of the seat belt by obtaining smooth extension and retraction of the front seat belt.

The guiding device of the invention allows a front seat belt to be drawn out of a retractor attached to the cross member in the automotive compartment through a belt passage hole surrounded by a bezel of the floor carpet through a boot covered by the floor carpet and secured to a floor tunnel into a guide secured to the side of the front seat, thereby preventing the front seat belt from disturbing the rear seat occupant's legs and preventing the seat belt from being contaminated, while also improving the external appearance and operation of the seat belt by obtaining smooth extension and retraction of the front seat belt.

These and other objects and features will become more apparent from the following description of the preferred embodiments of the present invention when read in connection with the accompanying drawings.

DESCRIPTION OF THE PREFERRED EMBODIMENTS

The present invention will now be described in more detail with reference to the accompanying drawings.

Figure 1:
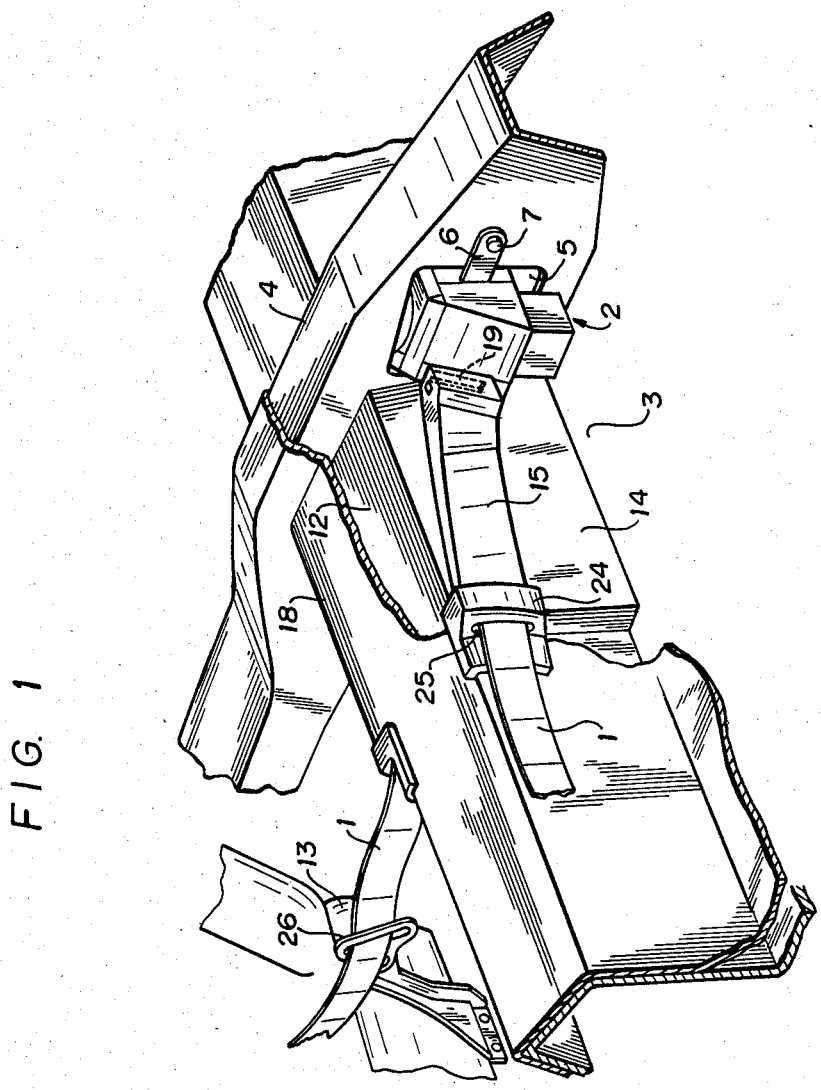
FIG. 1 is a perspective view showing an embodiment of a guiding device for a front seat belt constructed according to the present invention in which the floor carpet has been partly cut.
Figure 2:
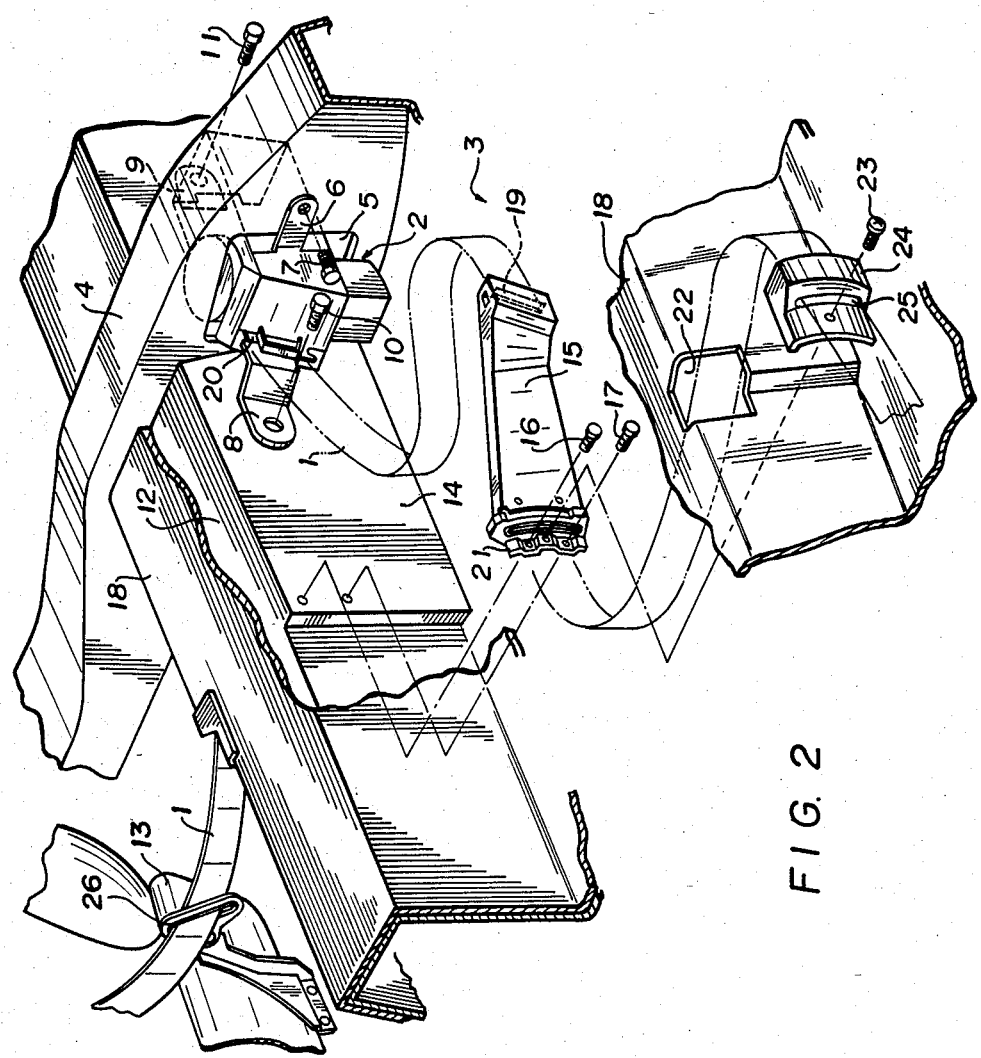
FIG. 2 is an exploded perspective view of the guiding device of the invention shown in FIG. 1.
Figure 3:
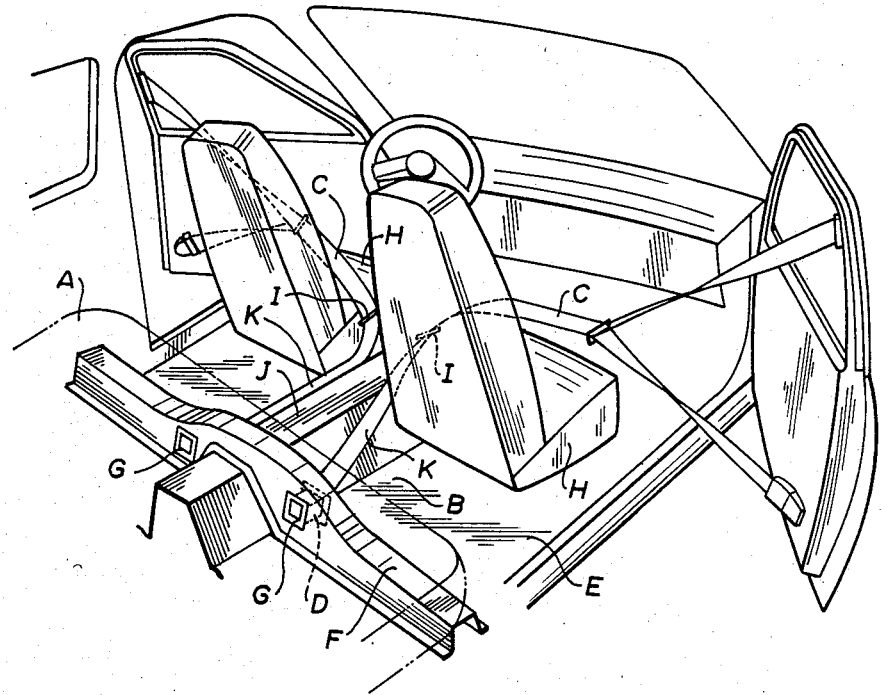
FIG. 3 is a perspective view showing a conventional front seat belt system.

FIGS. 1 and 2, show an embodiment of a guiding device for the front seat belt according to the present invention, a retractor 2 for the front seat belt 1 is inserted through an opening 5 at the front seat 13 side of the cross member 4 on the automotive floor 3 into the cross member 4, and is fixedly secured by earpiece 6 and bolt 7 to the cross member 4, and also is fixedly secured to the side face of the front tunnel 12 by earpieces 8, 9 and bolts 10, 11.

A rear seat (not shown) is fixedly disposed above the cross member 4, and a boot 15, for guiding the front seat belt 1 drawn out of the retractor 2, is clamped by bolts 16, 17 at the side 14 of the floor tunnel 12 between the front portion of the rear seat and the rear portion of a front seat 13.

The boot 15 is fixedly secured to the side 14 of the floor tunnel 12 and both are covered with floor carpet 18 so as not to be seen from the exterior.

The belt inlet 19 of the boot 15 is interfaced with the belt outlet 20 of the retractor 2, and a belt passage hole 22 is perforated through the floor carpet 18 and is matched up with the belt outlet 21 of the boot 15.

The hole 22 is surrounded by a bezel (annular member) 24 which is clamped by a bolt 23 to the outlet portion 21 of the boot 15, and the front seat belt 1 is drawn out of the belt passage hole 25 of the bezel 24.

The front seat belt 1 drawn from the above-described belt passage hole 22 and hence the hole 25 of the bezel 24 is inserted into a guide 26 fixedly secured to the side of the front seat 13, and continued to an automatic seat belt system (not shown).

In the foregoing embodiment shown in FIGS. 1 and 2, only the front seat 13 and the guide 26 are shown at the driver's seat side. However, it is noted that a similar guide is fixedly secured to passenger side of the front seat (not shown).

Figure 4:
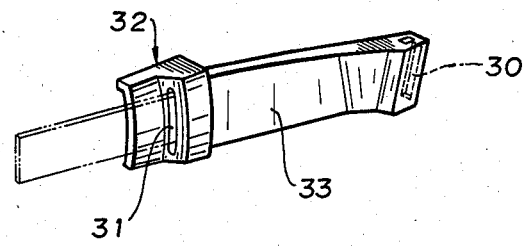
FIG. 4 is a perspective view showing another embodiment of the boot for guiding the front seat belt.

FIG. 4 shows a modified embodiment of the boot for guiding the front seat belt drawn from the retractor, in which the boot and bezel in the previous embodiment are integrally formed as a seat belt guiding member.

The modified seat belt member has an opening 30 formed at the rear end thereof which is interfaced with the belt outlet of the retractor, a bezel-shaped head 32 which has a belt passage hole 31 formed at the front end thereof, and a belt guiding passage 33 is formed at the intermediate portion thereof. This guiding member thus constructed is fixedly secured to the side of the floor tunnel with a bolt. The rear portion except the head 32 is covered with the floor carpet, and only the head 32 is exposed at the hole formed in the floor carpet.

As described above, the guiding device for the front seat belt of the invention is thus constructed and operated. In this guiding device, the boot 15 is disposed between the side 14 of the floor tunnel 12 and the floor carpet 18, the front seat belt 1 drawn out of the retractor 2 is guided through the boot 15, and drawn out from the passage hole 22 of the floor carpet 18 surrounded by the bezel 24. Accordingly, the front seat belt 1 does not disturb the legs of occupant sitting on the rear seat, and is not exposed at the leg supporting portion of the rear seat, thereby providing improved external appearance.

Further, the front seat belt 1 is guided in the boot 15. Accordingly, there is less friction between the belt 1 and the floor carpet 18 and the floor tunnel 12, thereby providing smooth extension and retraction of the seat belt and preventing the floor carpet from being disordered and hence collapsed in shape.

According to the present invention as described above, the front seat belt is not exposed to the occupant's leg supporting portion at the rear seat, does not disturb the legs of the occupant sitting on the rear seat nor is not contaminated by the rear seat occupant's feet.

In addition, the guiding device of the invention improves the external appearance of the leg supporting portion at the rear seat and smoothens the extension and retraction of the front seat belt from and to the retractor.

What is claimed is:

1. A guiding device for a front seat belt for a vehicle having a cross member formed at a rear seat side on an automotive floor and a floor tunnel comprising:

a retractor for the front seat belt, fixedly secured into an opening formed at the cross member, a boot fixedly secured to the side of the floor tunnel between the front side of the rear seat and the rear side of the front seat for guiding the front seat belt drawn from said retractor, and a floor carpet arranged to cover said boot and formed with a belt passage hole, from which the seat belt is drawn to the front seat side through a belt outlet formed at said boot.

2. The guiding device according to claim 1, further comprising:

a bezel formed with a belt passage hole for drawing the seat belt drawn out of said retractor at the belt passage hole of said floor carpet through said boot and the belt passage hole of said floor carpet to the front seat side.

3. The guiding device according to claim 2, wherein said bezel is fixedly secured to the floor tunnel via a front end flange formed to be disposed at the floor tunnel surface side.

4. The guiding device according to claim 2, wherein the front seat belt drawn out of the belt passage hole of said bezel is inserted into a guide fixedly secured to the side of the front seat.

5. The guiding device according to claim 1, wherein the belt passage hole of said boot at the rear end is interfaced with the belt outlet of said retractor, and the belt outlet at the other end thereof is interfaced with the belt passage hole of said floor carpet.

6. The guiding device according to claim 1, wherein said floor carpet covers said boot and said floor tunnel.

7. The guiding device according to claim 1, wherein said retractor comprises an earpiece disposed at the front surface side of the cross member, a front earpiece and a rear earpiece disposed at the side face of said floor tunnel, and said retractor is fixedly secured by bolts clamping the earpieces thereof.

8. The guiding device according to claim 1, wherein said boot is fixedly secured to the side of the floor tunnel by a bolt in the vicinity of the belt outlet at the end thereof.

9. The guiding device according to claim 1, wherein said boot is formed with an opening interfaced with the belt outlet of said retractor at the rear end thereof, a bezel-shaped head having a belt passage hole at the front end thereof, and a belt guiding passage at the intermediate thereof, said boot is covered with said floor carpet at the rear portion thereof except the bezel-shaped head, and said bezel-shaped head is arranged to be exposed at the side of the floor tunnel from the hole formed at said floor carpet.

* * * * *